United States Patent [19]

Chen

[11] Patent Number: 4,843,283
[45] Date of Patent: Jun. 27, 1989

[54] INFRARED RAY DETECTOR CONTROL ILLUMINATION SYSTEM

[76] Inventor: Jack Y. C. Chen, 841 Chung Shan N. Rd. Sec. 5, Taipei, Taiwan

[21] Appl. No.: 88,215

[22] Filed: Aug. 24, 1987

[51] Int. Cl.[4] ............................................. H05B 39/04
[52] U.S. Cl. .................... 315/153; 315/155; 315/159; 315/312; 340/567; 307/117
[58] Field of Search ............... 315/155, 159, 134, 152, 315/312; 340/567, 600, 565, 566; 307/117, 157

[56] References Cited

U.S. PATENT DOCUMENTS

| | | | |
|---|---|---|---|
| 4,305,021 | 12/1981 | Schreiden | 315/159 |
| 4,450,351 | 5/1984 | Fraden | 315/159 X |
| 4,461,977 | 7/1984 | Pierpont et al. | 315/159 |
| 4,588,926 | 5/1986 | Pezzolo | 315/159 X |
| 4,590,460 | 5/1986 | Abott et al. | 340/567 X |
| 4,650,986 | 3/1987 | Maile | 340/567 X |
| 4,663,521 | 5/1987 | Maile | 340/567 X |

*Primary Examiner*—James J. Groody
*Assistant Examiner*—Mark R. Powell
*Attorney, Agent, or Firm*—Wenderoth, Lind & Ponack

[57] ABSTRACT

An illumination control system has a plurality of infrared detection systems located in a plurality of adjacent scanning areas. Each of the detection systems controls the activation of light sources located in two or more scanning areas. Each of the detection systems is equipped with an infrared radiation sensor, an ambient light resistor, a timing circuit, a light source driving circuit, and a blinking condition prevention circuit.

4 Claims, 3 Drawing Sheets

INFRARED RAY DETECTOR CONTROL ILLUMINATION SYSTEM

BACKGROUND OF THE INVENTION

The present invention is related to a infrared ray detector control illumination system which is applicable for staircase of appartment or entrance and passageway of housing to achieve the benefits of convenience and to save power by controlling power ON/OFF automatically. Further, the invention can link up bell or alarm, and achieve multiple functions of alarm and visiting notice.

Most of the conventional illumination system are installed at certain place to control, such as the guide room of building or nearby entrance of housing; the progressive type distribute optical sensors at some necessary places, the lights will be turned on automatically when illumination is not enough, then turned off by hand, or controlled by the said optical sensor or another set of sensor to detect if illumination is enough; if the system is designed to turn off manually, the user always forget or delay to turn off the light thus result waste energy.

If the system is controlled to turn off by optical sensor, as the illumination is turned on to irradiate on the optical resistor, the resistance value of the optical resistor become small and form grounding short circuit, therefore, the power will be cut off, but when the light source disappear, the resistance value of the optical resistor become large and turn on the light; consequently, the illumination system will cause glisten, it is very harmful for vision of user also the illumination system will be damaged frequently.

SUMMARY OF THE INVENTION

The main object of the present invention is to provide a glisten prevented circuit and the light will not be effected by optical resistor to avoid glisten when the illumination system is started. So when it is installed, there is no need to reduce the indensity of the illumination because of the effect of optical resistance (CDS), or the optical sensor can not be positioned at the best reconnaissance range because it is confined to the position and angle.

The second object of the present invention is to provide the illumination system which the infrared ray detector match with optical resistance (CDS), it can detect to turn on and turn off automatically, further, achieve the effect of save energy during enough illumination.

The third object of the invention is to provide the delay circuit, after people left out of the reconnaissance range and optical sensor receive the signal no more, it will delay to irradiate and turn off till time up.

The fourth object of the invention is related to use in single set or link multiple sets up and to control in one lamp or several lamps, when it link several sets up, it can link to control the shared one illumination between two sets, it enable the user to be the center of lamp, the user always be irradiated whether upstair or downstair, it also prevents user from danger and inconvenience because there is no illumination on upper floor when the user returns back.

BRIEF DESCRIPTION OF THE DRAWING

FIG. 4 showing the preferred embodiment of several applications in staircase of the present invention.

DESCRIPTION OF THE PREFERRED EMBODIMENT

Figure 1:
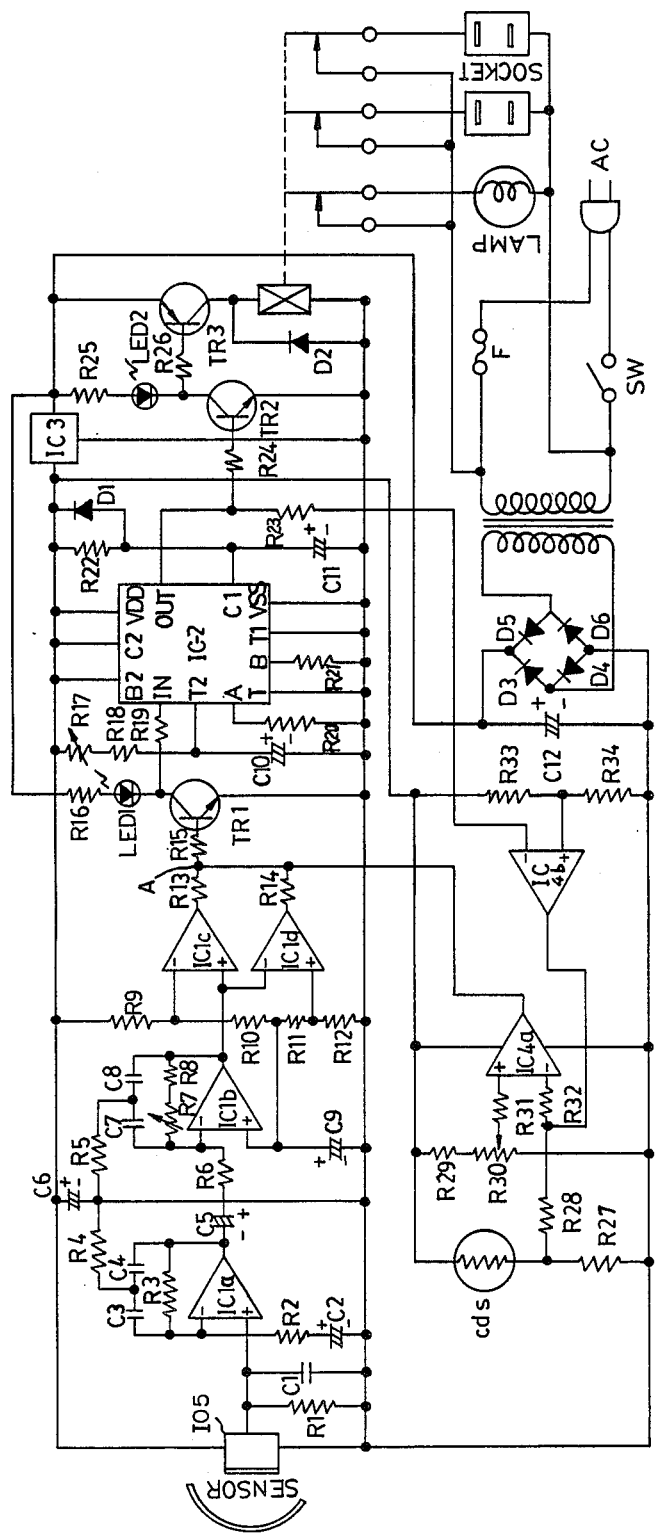
FIG. 1 showing the drive control circuit of the present invention.

As shown in FIG. 1, the present invention comprising:

Thermolelectric infrared optical sensor as medium of signal detector, a convergence len is positioned upon it, which is provide to converge infrared ray radiation from human body, and as energy transition, output constant voltage drop signal to intergrated circuit.

A intergrated circuit is used as control circuit of illumination system, it starts with the positive of IC1$a$, which is drived by optical sensor, amplify signal and C1 filter; IC1$a$ and R2, R3, R4 and C2, C3, C4 form non-reverse a; ternative amplifier to delete unnecessary frequency and amplify necessary frequency, the amplified signal pass to negative pole of IC1$b$ through C5 and C6, refilter the second non-reverse alternative amplifier to delete unnecessary frequency, only amplify reception frequency, R7 of semifixed resistance can adjust to control amplify range of IC1$b$; then the said output signal of IC1$b$ compare with the amplitude restricted comparator formed by IC1$c$ and IC1$d$ and R9, R10, R11, R12, to decide whether the transistor TR1 start ON/circuit to ground or not, in other words, if voltage level of input signal is lower than standard voltage at negative of IC1$c$, IC1$c$ output forms LOW, on the contrary, output forms HIGH, the situation of IC1$d$ turns out contrary to IC1$c$; therefore, the input level is over any level of IC1$c$ negative end or IC1$d$ positive end, the positive flows to original pole of TR1 through resistance R13, R14, R15, enable TR1 to start ON/circuit to ground, then light-emitting diode LED1 is luminous. When TR1 is ON/circuit to ground, the intergrated circuit change resistance R19 to LOW level from HIGH level, and "IN" end of IC-2 also change into LOW level, if the deleted terminal "C1" of IC-2 is positioned at HIGH level, "T2" and of IC-2 will position at LOW level, thereupon, C10 emit current from "T2" end, meanwhile output terminal "OUT" of IC-2 output with HIGH level to the orifinal pole of transistor TR2 and negative of IC4$b$ through the resistance R23 and R24 enable transistor TR3 ON/circuit, then the positive current flow toward the diode D2 and both end of relay coil, and the relay absorb enable the connected point ON/circuit, therewith AC power flow through the connected point of the relay, enable lamp or proper illumination system is luminous to develop the effect of illumination.

Under sufficient lighting, the said control circuit can cancel the drive circuit of illumination system automatically, enable the signal of optical sensor can not drive to start the illumination system; the principle is:

While the lighting is sufficient, the optical resistor (CDS) is irradiated enable it's resistance value change small, and voltage drop also change small, therefore, the negative voltage of IC4$a$ is larger than the standard voltage of positive, and the output end of IC4$a$ is ON/-circuit to ground, enable one end of resistance R13 or R14 is shorted to ground, then the output of IC1c and IC1d are terminated, and transistor TR1 can not start without positive voltage, so while the lighting is sufficient, the illumination system will not start to waste power even human body intrude into the range of the installation.

In order to counter the defect of conventional detect circuit that the optical resistor is irradiated and resistance value is reduced, it will ground to short-circuit and turn off the illumination system, then turn on at once to form flasher, so the present invention provide a flasher prevent circuit to achieve the purpose without flasher, the principle is:

While human body intrudes to react the system be irradiated, the "OUT" terminal of IC-2 output with HIGH level to negative of IC4b through R23, and output end of IC4b connect to ground, thus one end of resistance R28 is grounded, at the same time, the viariation of optical resistor (CDS) do not enable the output of IC4a connect to ground, thus the characteristic of the illumination installation will not turn off and flasher improperly.

As human body is outside the range of detector, the present invention can drive to turn off illumination by delay circuit. When optical sensor has not signal input, both IC1a and IC1b also are without signal, and the comparision output is at LOW, transistor TR1 open circuit without bias, thus positive voltage flow toward input end "IN" through R16 and R19, enable "IN" end from low level become high level, meanwhile, if deduction terminal of IC-2 is also at HIGH level "T2" terminal of IC-2 will from emitting current situation become voltage ratio situation, owing to C10 is emitted current, so voltage of both end are lower than standard voltage in IC-2, and output end "OUT" of IC-2 is at HIGH level, enable transistor TR2 and TR3 to connect, positive still flow toward the relay and enable illumination installation still form ON status. Because the resistance R17 and R18 will be changed to the capacitor C10, and Voltage at both end of C10 will be higher and higher, when voltage at both end of C10 is higher than the standard voltage in IC-2, the output end "OUT" of IC-2 will become LOW level from HIGH level enable the transistor TR2 and TR3 to OFF/ circuit, relay stops, and illumination installation in OFF status. As mentioned above, the delay circuit is controlled by signal of body sensor, it keep on delay when human body is out of the range of detector, and will be off circuit after the time setting is over.

As stated above, we understand that it is possible to change the time of delay just to change the resistance value of semi-variation resistance R17. The present invention is provided with delay circuit, while human body is in the range of detector even the time is very short, the illumination installation keep on irradiating for a certain time because of the delay circuit.

While the invention is applied, it can prevent sensor and circuit from mistake detection through delay start action circuit when it is ON/circuit. The delay start action circuit is composed by deleted terminal "C1" of IC-2 and R22 and C11. When IC-2 terminal "C1" is at HIGH level, delete not to react and deleted action of IC-2 will react when it is at LOW level; the IC-2 output end "out" forces to stop output and become at LOW level, T2 terminal is changed to C10 with high speed and IC-2 forms deduction of with-out output. So while power respurce have not connected yet, the C11 remaining voltage will emit current through diode D1. When it turns on, positive voltage flow through stable voltage IC3 and resistance R22 and charge to C11, at begining of charge, the voltage at both end of C11 are low, IC-2 delete terminal "C1" is at LOW level, and deduction react. C11 will overflow after a certain time, the delete terminal "C1" of IC-2 just changes into HIGH level from LOW, the deduction stops, thus the delay start action is finished.

Figure 3:
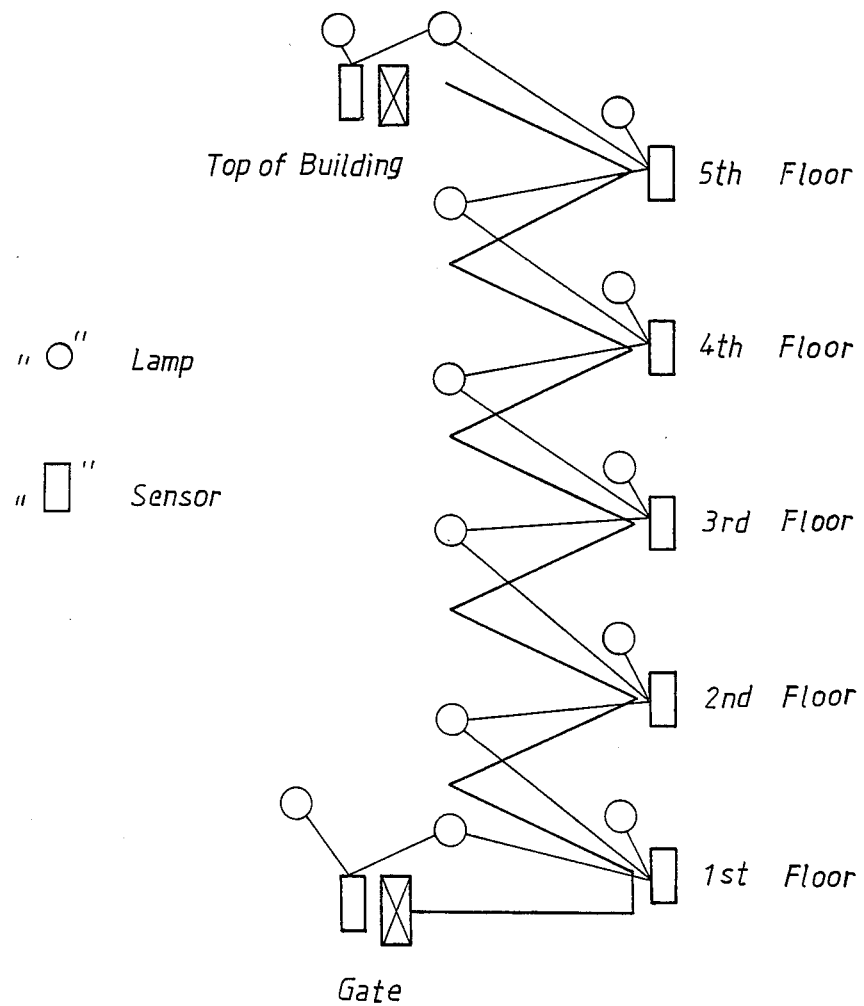
FIG. 3 showing the series sketch of several groups of illumination facility of the present invention.

As shown in FIG. 3 and FIG. 4, the preferred embodiment of the present invention is applied in staircase, it can link up several sets to use, the way to control is to make each illumination installation ON/OFF in position order from human body signal, one or several illumination installations that shared by two neighbor sets can ON/OFF overlapping by connected to link up control.

Figure 2:
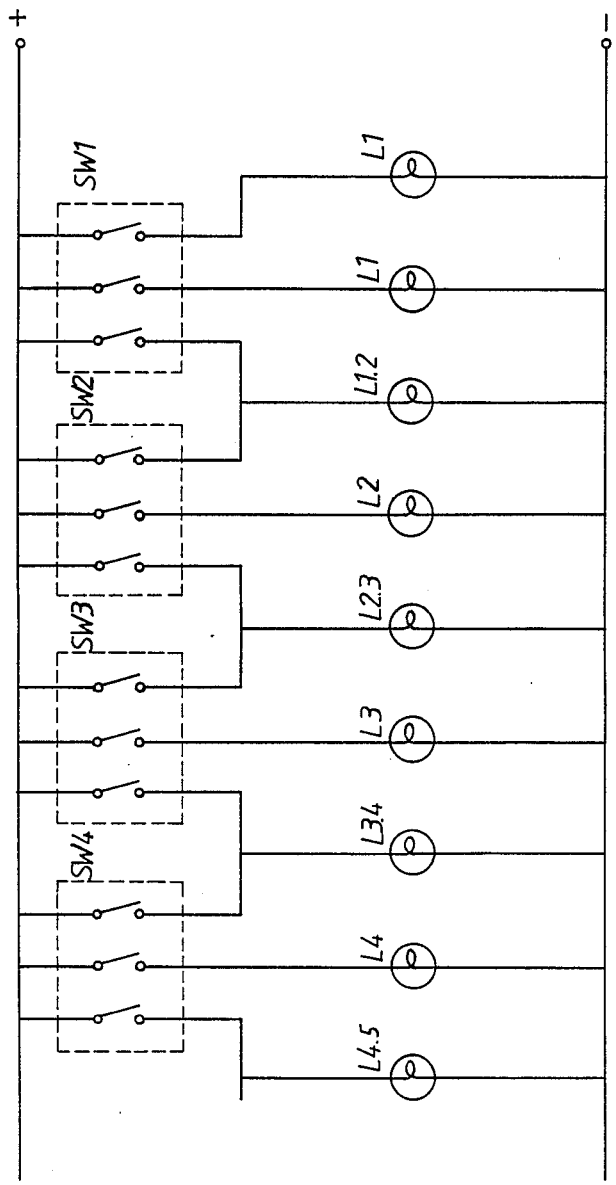
FIG. 2 showing the control flow chart of control circuit of the present invention.

As shown in FIG. 2 the control flow chart which detects whether light is sufficient and have not to drive the circuit or not by the optical resistance, and use sensor to detect human body's signal to start circuit and prevent glisten circuit, simultaneously, count the time to delay, how long to delay it lasts can be decides by semivariation resistance R17. If human body signal still input, the circuit and prevent glisten circuit keep on driving and the time to delay counts again. If human body signal has no input, it turns illumination installation off after the time to delay mediates and back to the initial form. The optical resistor just detects whether light is sufficient or not, it will not develop the effect in the effective process of sensor and prevent to glisten.

As brief of above mention, the present invention is formed by a automatic drive illumination installation system is detected by infrared ray, the optical resistor distinguish the intensity of light and match design of each kind circuit, further, it can be applied in one set or link up several sets in series as required, it is equipped as an illumination installation which provides performance of safe, convenient and save power.

I claim:

1. An illumination control system comprising:
    a plurality of infrared detection systems located in a plurality of areas, wherein each of said areas is adjacent to at least one of another of said areas;
    a plurality of light sources, wherein at least one of said light sources is located in each of said areas;
    wherein each of said infrared detection systems has coupled thereto at least one of said lights sources from each of at least two adjacent said areas;
    wherein each of said infrared detection systems is provided with a means to detect infrared radiation and a means to activate at least one light source in response to said detection of infrared radiation;
    whereby as an infrared radiation emitting body travels through said areas, a light source is activated in an area in which said body is located as well as in at least one area adjacent to said area in which said body is located.

2. An illumination control system as claimed in claim 1, wherein each of said infrared detection systems comprises:
    an infrared radiation sensor for outputting a sensor potential in response to a detection of infrared radiation;
    an optical resistor, said optical resistor having a resistance value that is inversely proportional to an amount of ambient light impinging thereon;
    a means for applying a first signal level at a node in response to said sensor potential being above a threshold value and a second signal level at said node in response to said sensor potential being below a threshold value;

a means for grounding said node when said optical resistor has a resistance being below a threshold resistance;

a timing means coupled to said node, said timing means outputting a third signal level when said node is at said first signal level, and said timing means outputting a fourth signal level when said node is grounded or when said node is at said second signal level, a blinking prevention means coupled to an output of said timing means and to said node for preventing said grounding of said node, said blinking prevention means operating in response to said third signal level output from said timing means;

a light source means coupled to an output of said timing means, said light source activating in response to said third signal level output from said timing means;

a deactivation delay means coupled to said timing means for delaying deactivation of said light source means in response to said sensor potential dropping below said threshold value; and, an activation delay means coupled to said timing means for delaying activation of said light source means in response to said sensor potential rising above said threshold value.

3. An illumination control system as claimed in claim 2, wherein said timing means is monostable timing circuit.

4. An illumination control system as claimed in claim 3, wherein said light source means comprises:

a relay coil coupled to a plurality of light sources;

a relay coil driving means for activating said relay coil in response to said third signal level output from said timing means.

* * * * *